(12) United States Patent
Feng

(10) Patent No.: US 11,863,060 B2
(45) Date of Patent: Jan. 2, 2024

(54) CONTROL CIRCUIT OF BUCK CONVERTER, AND SERVER

(71) Applicant: INSPUR SUZHOU INTELLIGENT TECHNOLOGY CO., LTD., Jiangsu (CN)

(72) Inventor: Ziqiu Feng, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,217

(22) PCT Filed: Dec. 30, 2021

(86) PCT No.: PCT/CN2021/142850
§ 371 (c)(1),
(2) Date: Jun. 29, 2023

(87) PCT Pub. No.: WO2022/151983
PCT Pub. Date: Jul. 21, 2022

(65) Prior Publication Data
US 2023/0396146 A1 Dec. 7, 2023

(30) Foreign Application Priority Data
Jan. 16, 2021 (CN) .......................... 202110058576.3

(51) Int. Cl.
*H02M 1/08* (2006.01)
*H02M 3/158* (2006.01)

(52) U.S. Cl.
CPC ............. *H02M 1/08* (2013.01); *H02M 3/158* (2013.01)

(58) Field of Classification Search
CPC ................................ H02M 1/08; H02M 3/158
See application file for complete search history.

(56) References Cited

U.S. PATENT DOCUMENTS 4,418,290 A * 11/1983 Nagano ................ H03K 5/2418
330/252
4,658,205 A * 4/1987 Yamada .................. G05F 3/225
323/907
5,627,461 A * 5/1997 Kimura ..................... G05F 3/30
323/312

(Continued)

FOREIGN PATENT DOCUMENTS

CN 101777770 A 7/2010
CN 102128973 A 7/2011

(Continued)

*Primary Examiner* — Rafael O De Leon Domenech
(74) *Attorney, Agent, or Firm* — IPro, PLLC

(57) ABSTRACT

Provided is a control circuit of a buck converter, comprising three transistors, seven resistors and a comparator. Also provided is a server. In this solution, when a phase voltage of a buck converter changes, a controller in the buck converter is controlled to output a signal for turning off a lower MOS transistor, so that after the signal is transmitted through the line, the lower MOS transistor can be controlled to be exactly turned off just when the current is reversed. Such an accurate reverse current detection function can reduce the voltage loss of the buck converter, thereby improving the efficiency of a system in standby or having a light load.

20 Claims, 1 Drawing Sheet

(56) References Cited

U.S. PATENT DOCUMENTS

| | | | | |
|---|---|---|---|---|
| 9,509,488 | B1* | 11/2016 | Huang | H04L 25/0276 |
| 2006/0220743 | A1* | 10/2006 | Kojima | H03G 1/0088 |
| | | | | 330/283 |
| 2012/0146604 | A1* | 6/2012 | Seki | H02M 3/158 |
| | | | | 323/282 |
| 2019/0363625 | A1 | 11/2019 | Kirchner et al. | |
| 2021/0159897 | A1* | 5/2021 | Watanabe | H03K 17/0812 |

FOREIGN PATENT DOCUMENTS

| | | | |
|---|---|---|---|
| CN | 103475195 | A | 12/2013 |
| CN | 103944425 | A | 7/2014 |
| CN | 104518689 | A | 4/2015 |
| CN | 110391736 | A | 10/2019 |
| CN | 211981750 | U | 11/2020 |
| CN | 112910224 | A | 6/2021 |

* cited by examiner

CONTROL CIRCUIT OF BUCK CONVERTER, AND SERVER

CROSS-REFERENCE TO RELATED APPLICATION

The present disclosure claims the priority of the Chinese patent application filed on Jan. 16, 2021 before the CNIPA, China National Intellectual Property Administration with the application number of 202110058576.3 and the title of "CONTROL CIRCUIT OF BUCK CONVERTER, AND SERVER", which is incorporated herein in its entirety by reference.

FIELD

The present disclosure relates to the field of buck converters and, more particularly, to a control circuit of a buck converter and a server.

BACKGROUND

In a discontinuous current mode (DCM), the inductor current of a synchronous buck converter may be less than zero. The function of a reverse current detection circuit is to detect a real-time magnitude of the inductor current, and when the inductor current is equal to zero, a detection signal is output to turn off a lower MOS transistor, to ensure that the inductor current does not have a reverse current.

If the lower MOS transistor is turned off early ($Q_{lower}$ in FIG. 2), in the remaining time, current freewheels through a body diode of the lower MOS transistor, resulting in increased losses. Delaying the turn-off of the lower MOS transistor causes the inductor current to flow in reverse, which reduces the efficiency of the buck converter. Therefore, the accuracy of the turn-off time is a key indicator of the reaction detection circuit.

In order to compensate the propagation delay of the circuit, the conventional method is to output the detection signal in advance to turn off the lower MOS transistor in time. Alternatively, a delay parameter is introduced in the controller to counteract the propagation delay.

However, the above methods may only turn off the lower MOS transistor at a specific output voltage, and cannot accurately turn off the lower MOS transistor in a buck converter with a wide output voltage range.

SUMMARY

The present disclosure provides a control circuit of a buck converter, including:
a first transistor, a base electrode of the first transistor receiving an output voltage of the buck converter;
a second transistor, a base electrode of the second transistor being connected to an emitter electrode of the first transistor;
a third transistor, a base electrode of the third transistor being connected to a of the second transistor;
a first resistor, one end of the first resistor being connected to a collector electrode of the third transistor;
a second resistor, one end of the second resistor being connected to the other end of the first resistor;
a fourth transistor, a collector electrode of the fourth transistor being connected to the other end of the second resistor;
a third resistor, one end of the third resistor being connected to an emitter electrode of the third transistor, and the other end of the third resistor receiving a phase voltage of the buck converter;
a fourth resistor, one end of the fourth resistor being connected to an emitter electrode of the fourth transistor and the other end of the fourth resistor being connected to a collector electrode of the first transistor;
a fifth resistor and a sixth resistor, one end of the fifth resistor being connected to the base electrode of the third transistor, the other end of the fifth resistor being connected to one end of the sixth resistor, and the other end of the sixth resistor being connected to a base electrode of the fourth transistor;
a seventh resistor, one end of the seventh resistor being connected to an emitter electrode of the second transistor and the other end of the seventh resistor being connected to a collector electrode of the first transistor; and
a comparator, a positive input end of the comparator being connected to the collector electrode of the fourth transistor, a negative input end of the comparator being connected to the collector electrode of the third transistor, and an output end of the comparator being connected to a controller of the buck converter.

In some embodiments, the comparator is configured to output a preset signal to the controller of the buck converter in response to voltages input at the positive input end of the comparator and the negative input end of the comparator being equal.

In some embodiments, the voltages input at the positive input end of the comparator and the negative input end of the comparator are equal when a phase voltage of the buck converter satisfies the following condition:

$$V_{phase} = \frac{R_5}{R_7} V_{out}$$

$R_5$ being a resistance value of the fifth resistor, $R_7$ being a resistance value of the seventh resistor, $V_{out}$ being the output voltage of the buck converter, and $V_{phase}$ being the phase voltage of the buck converter.

In some embodiments, the controller is configured to generate a signal to control turning off of the lower MOS transistor in the buck converter in response to receiving the preset signal.

In some embodiments, a resistance value of the first resistor is equal to a resistance value of the second resistor and a resistance value of the third resistor is equal to a resistance value of the fourth resistor.

The present disclosure also provides a server including the control circuit of a buck converter in any of the foregoing embodiments.

BRIEF DESCRIPTION OF THE DRAWINGS

In order to explain the technical solutions of the present disclosure more clearly, the following contents will briefly introduce the drawings which need to be used in the embodiments, and it would be obvious for a person skilled in the art to obtain other embodiments according to these drawings without involving any inventive effort.

DETAILED DESCRIPTION

In order that the objects, technical solutions and advantages of the present disclosure may be more clearly understood, embodiments of the present disclosure will be described in further detail below in combination with the detailed embodiments with reference to accompanying drawings.

It should be noted that all the expressions using "first" and "second" in the embodiments of the present disclosure are used for distinguishing two different entities or different parameters with the same name. It can be seen that "first" and "second" are merely for the convenience of expressions and should not be understood as limiting the embodiments of the present disclosure, and the subsequent embodiments will not be described regarding this one by one.

Figure 1:
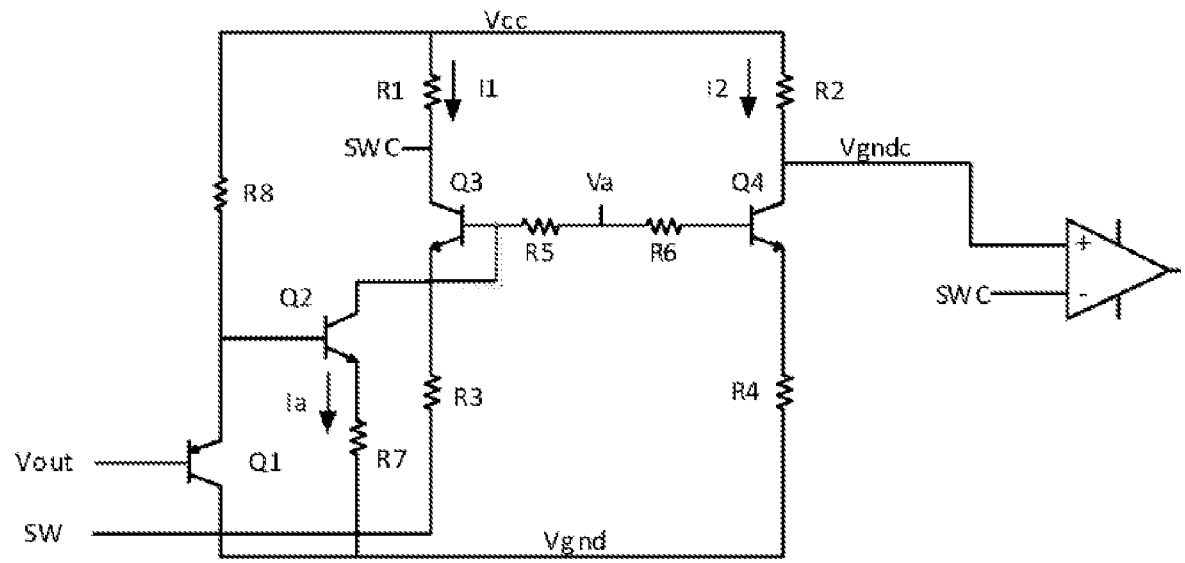
FIG. 1 is a schematic structural diagram of a control circuit of a buck converter as provided herein according to one or more embodiments.

In some embodiments, the present disclosure provides a control circuit of a buck converter. As shown in FIG. 1, the control circuit of a buck converter may include:

a first transistor Q1, a base electrode of the first transistor Q1 receiving an output voltage $V_{out}$ of the buck converter;

a second transistor Q2, a base electrode of the second transistor Q2 being connected to an emitter electrode of the first transistor Q1;

a third transistor Q3, a base electrode of the third transistor Q3 being connected to a collector electrode of the second transistor Q2;

a first resistor R1, one end of the first resistor R1 being connected to a collector electrode of the third transistor Q3;

a second resistor R2, one end of the second resistor R2 being connected to the other end of the first resistor R1;

a fourth transistor Q4, a collector electrode of the fourth transistor Q4 being connected to the other end of the second resistor R2;

a third resistor R3, one end of the third resistor R3 being connected to an emitter electrode of the third transistor Q3, and the other end of the third resistor R3 receiving a phase voltage of the buck converter;

a fourth resistor R4, one end of the fourth resistor R4 being connected to an emitter electrode of the fourth transistor Q4 and the other end of the fourth resistor R4 being connected to a collector electrode of the first transistor Q1;

a fifth resistor R5 and a sixth resistor R6, one end of the fifth resistor R5 being connected to the base electrode of the third transistor Q3, the other end of the fifth resistor R5 being connected to one end of the sixth resistor R6, and the other end of the sixth resistor R6 being connected to a base electrode of the fourth transistor Q4;

a seventh resistor R7, one end of the seventh resistor R7 being connected to an emitter electrode of the second transistor Q2 and the other end of the seventh resistor R7 being connected to a collector electrode of the first transistor Q1; and a comparator, a positive input end of the comparator being connected to the collector electrode of the fourth transistor Q4, a negative input end of the comparator being connected to the collector electrode of the third transistor Q3, and an output end of the comparator being connected to a controller of the buck converter.

In the control circuit of a buck converter provided herein, when a phase voltage of a buck converter changes, a controller in the buck converter is controlled to output a signal for turning off a lower MOS transistor ($Q_{lower}$ in FIG. 2), so that after the signal is transmitted through the line, the lower MOS transistor ($Q_{lower}$) can be controlled to be exactly turned off just when the current is reversed. Such an accurate reverse current detection function can reduce the voltage loss of the buck converter, thereby improving the efficiency of a system in standby or having a light load.

In some embodiments, a resistance value of the first resistor R1 is equal to a resistance value of the second resistor R2 and a resistance value of the third resistor R3 is equal to a resistance value of the fourth resistor R4.

In some embodiments, in the control circuit shown in FIG. 1, the magnitude of the current flowing through the first resistor R1 may be:

$$I_1 = \frac{1}{2}\beta_1(V_a - V_{thn1} - I_aR_5 - I_1R_3 - V_{phase})^2$$

wherein $V_{thn1}$ is a voltage drop when the third transistor Q3 is conducting, $\beta_1$ is a parameter of the third transistor Q3, and a difference between a left side of the fifth resistor R5 (the side close to the base electrode of the third transistor Q3) and an upper side of the third resistor R3 (the side close to the emitter electrode of the third transistor Q3) may be obtained by calculating the value of $(V_a - V_{thn1} - I_aR_5 - I_1R_3 - V_{phase})$.

The magnitude of the current flowing through the second resistor R2 may be:

$$I_2 = \frac{1}{2}\beta_2(V_a - V_{thn2} - I_2R_4 - V_{gnd})^2$$

wherein $V_{thn2}$ is a voltage drop when the fourth transistor Q4 is conducting, $\beta_2$ is a parameter of the fourth transistor Q4, and a difference between a left side of the sixth resistor R6 (the side close to the base electrode of the fourth transistor Q4) and an upper side of the fourth resistor R4 (the side close to the emitter electrode of the fourth transistor Q4) can be obtained by calculating the value of $(V_a - V_{thn2} - I_2R_4 - V_{gnd})$.

The resistance value of the first resistor R1 is equal to the resistance value of the second resistor R2, the resistance value of the third resistor R3 is equal to the resistance value of the fourth resistor R4, and the parameters of the third transistor Q3 and the fourth transistor Q4 are also the same. Therefore, when the voltage $V_{SWC}$ at the collector electrode of the fourth transistor Q4 and the voltage $V_{gndc}$ at the collector electrode of the third transistor Q3 are equal, $I_1$ is equal to $I_2$, and it can be obtained by the foregoing formula:

$$V_{phase} - V_{gnd} - I_aR_5$$

In some embodiments, since $V_{gnd}$ can be approximated to zero, $V_{phase} - I_aR_5$ can be approximated. According to the principle of the transistor, it can be seen that a voltage at the base electrode of the second transistor Q2 in FIG. 1 is equal to a voltage at the emitter electrode thereof, and a voltage at the base electrode of the first transistor Q1 is equal to a voltage at the emitter electrode thereof. Due to the connection of the base electrode of the second transistor Q2 and the emitter electrode of the first transistor Q1, a voltage at the base electrode of the first transistor Q1 is equal to a voltage at the emitter electrode of the second transistor Q2, namely, $V_{out}=I_a R_7.$ Thus, according to $V_{out}=I_a R_7$ and $V_{phase}=I_a R_5$, it can be obtained that:

$$V_{phase} = \frac{R_5}{R_7} V_{out}.$$

At this time, the voltages input by the positive input end of the comparator and the negative input end of the comparator are equal, and the comparator can output a preset signal, and the controller in the buck converter can output a signal for controlling the turning off of the lower MOS transistor $Q_{lower}$ after receiving the preset signal. Therefore, it is possible to achieve accurate turning off of the lower MOS transistor $Q_{lower}$ in different output voltages by adjusting the resistance values of the fifth resistor R5 and the seventh resistor R7.

In some embodiments, the controller is configured to generate a signal to control turning off of the lower MOS transistor $Q_{lower}$ in the buck converter in response to receiving the preset signal.

Figure 2:
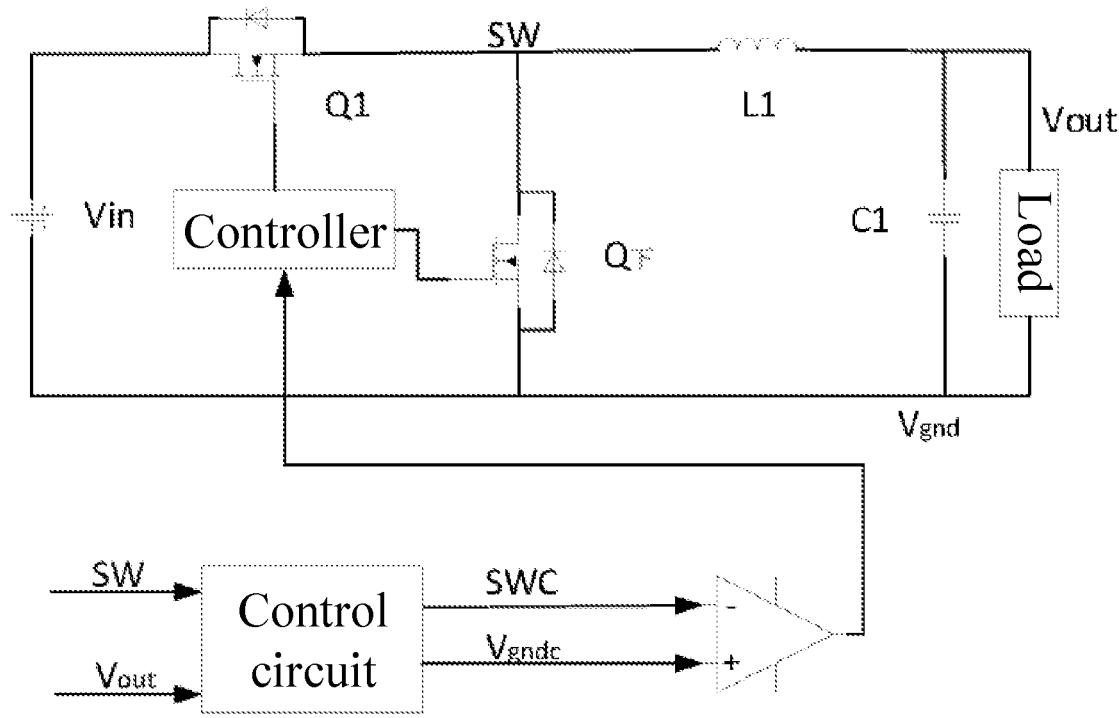
FIG. 2 is a schematic structural diagram of the control circuit of a buck converter according to one or more embodiments.

Specifically, as shown in FIG. 2, the output end of the comparator shown in FIG. 1 can be connected to the controller in the buck converter shown in FIG. 2, so that the controller outputs a signal to turn off the lower MOS transistor $Q_{lower}$ after receiving a preset signal output by the comparator, so that after the signal is transmitted through the line, the lower MOS transistor ($Q_{lower}$) can be controlled to be exactly turned off just when the current is reversed. Such an accurate reverse current detection function can reduce the voltage loss of the buck converter, thereby improving the efficiency of a system in standby or having a light load.

Based on the same inventive concept, in some embodiments, the present disclosure also provides a server including the control circuit of a buck converter in any of the foregoing embodiments.

The foregoing are exemplary embodiments disclosed herein, but it should be noted that various changes and modifications could be made therein without departing from the scope of the disclosed embodiments as defined by the appended claims. The functions, steps, and/or actions of the method claims in accordance with the disclosed embodiments described herein do not need to be performed in any particular order. Furthermore, although elements disclosed in the embodiments may be described or claimed in the singular form, they may be contemplated as in a plurality unless limitation to the singularity is explicitly stated.

It will be understood that, as used herein, the singular forms "a" and "an" are intended to include the plural forms as well, unless the context clearly supports the exception.

The foregoing sequence of the embodiments of the present disclosure has been presented for purposes of illustration only and is not intended to represent the advantages or disadvantages of the embodiments.

Those of ordinary skill in the art will appreciate that the discussion of any embodiment above is intended to be exemplary only, and is not intended to imply that the scope of the disclosure of the embodiments of the present disclosure, including the claims, is to be limited to these examples. Combinations of the features in the foregoing embodiments or in different embodiments are also possible within the framework of the embodiments of the present disclosure, and many other variations of the different aspects of the embodiments of the present disclosure as described above are not provided in detail for the sake of brevity. Thus, it is intended that the scope of protection of the embodiments of the present disclosure cover the omissions, modifications, equivalents, and improvements falling within the spirit and principle of the embodiments of the present disclosure.

The invention claimed is:

1. A control circuit of a buck converter, comprising:
   a first transistor, a base electrode of the first transistor receiving an output voltage of the buck converter;
   a second transistor, a base electrode of the second transistor being connected to an emitter electrode of the first transistor;
   a third transistor, a base electrode of the third transistor being connected to a collector electrode of the second transistor;
   a first resistor, one end of the first resistor being connected to a collector electrode of the third transistor;
   a second resistor, one end of the second resistor being connected to the other end of the first resistor;
   a fourth transistor, a collector electrode of the fourth transistor being connected to the other end of the second resistor;
   a third resistor, one end of the third resistor being connected to an emitter electrode of the third transistor, and the other end of the third resistor receiving a phase voltage of the buck converter;
   a fourth resistor, one end of the fourth resistor being connected to an emitter electrode of the fourth transistor and the other end of the fourth resistor being connected to a collector electrode of the first transistor;
   a fifth resistor and a sixth resistor, one end of the fifth resistor being connected to the base electrode of the third transistor, the other end of the fifth resistor being connected to one end of the sixth resistor, and the other end of the sixth resistor being connected to a base electrode of the fourth transistor;
   a seventh resistor, one end of the seventh resistor being connected to an emitter electrode of the second transistor and the other end of the seventh resistor being connected to a collector electrode of the first transistor; and a comparator, a positive input end of the comparator being connected to the collector electrode of the fourth transistor, a negative input end of the comparator being connected to the collector electrode of the third transistor, and an output end of the comparator being connected to a controller of the buck converter.

2. The control circuit according to claim 1, wherein the comparator is configured to output a preset signal to the controller of the buck converter in response to voltages input at the positive input end of the comparator and the negative input end of the comparator being equal.

3. The control circuit according to claim 2, wherein the controller is configured to generate a signal to control turning off of the lower MOS transistor in the buck converter in response to receiving the preset signal.

4. The control circuit according to claim 2, wherein a resistance value of the first resistor is equal to a resistance value of the second resistor and a resistance value of the third resistor is equal to a resistance value of the fourth resistor.

5. The control circuit according to claim 1, wherein the voltages input at the positive input end of the comparator and the negative input end of the comparator are equal when a phase voltage of the buck converter satisfies the following condition:

$$V_{phase} = \frac{R_5}{R_7} V_{out}$$

$R_5$ being a resistance value of the fifth resistor, $R_7$ being a resistance value of the seventh resistor, $V_{out}$ being the output voltage of the buck converter.

6. The control circuit according to claim 1, wherein the controller is configured to generate a signal to control turning off of the lower MOS transistor in the buck converter in response to receiving the preset signal.

7. The control circuit according to claim 1, wherein a resistance value of the first resistor is equal to a resistance value of the second resistor and a resistance value of the third resistor is equal to a resistance value of the fourth resistor.

8. The control circuit according to claim 1, wherein the magnitude of the current flowing through the first resistor is:

$$I_1 = \frac{1}{2}\beta_1(V_a - V_{thn1} - I_aR_5 - I_1R_3 - V_{phase})^2$$

wherein $V_{thn1}$ is a voltage drop when the third transistor is conducting, $\beta_1$ is a parameter of the third transistor.

9. The control circuit according to claim 8, wherein magnitude of the current flowing through the second resistor is:

$$I_2 = \frac{1}{2}\beta_2(V_a - V_{thn2} - I_2R_4 - V_{gnd})^2$$

wherein $V_{thn2}$ is a voltage drop when the fourth transistor is conducting, $\beta_2$ is a parameter of the fourth transistor.

10. The control circuit according to claim 9, wherein parameters of the third transistor are the same as parameters of the fourth transistor.

11. A server comprising a control circuit of a buck converter, the control circuit of a buck converter comprising:
a first transistor, a base electrode of the first transistor receiving an output voltage of the buck converter;
a second transistor, a base electrode of the second transistor being connected to an emitter electrode of the first transistor;
a third transistor, a base electrode of the third transistor being connected to a collector electrode of the second transistor;
a first resistor, one end of the first resistor being connected to a collector electrode of the third transistor;
a second resistor, one end of the second resistor being connected to the other end of the first resistor;
a fourth transistor, a collector electrode of the fourth transistor being connected to the other end of the second resistor;
a third resistor, one end of the third resistor being connected to an emitter electrode of the third transistor, and the other end of the third resistor receiving a phase voltage of the buck converter;
a fourth resistor, one end of the fourth resistor being connected to an emitter electrode of the fourth transistor and the other end of the fourth resistor being connected to a collector electrode of the first transistor;
a fifth resistor and a sixth resistor, one end of the fifth resistor being connected to the base electrode of the third transistor, the other end of the fifth resistor being connected to one end of the sixth resistor, and the other end of the sixth resistor being connected to a base electrode of the fourth transistor;
a seventh resistor, one end of the seventh resistor being connected to an emitter electrode of the second transistor and the other end of the seventh resistor being connected to a collector electrode of the first transistor;
and a comparator, a positive input end of the comparator being connected to the collector electrode of the fourth transistor, a negative input end of the comparator being connected to the collector electrode of the third transistor, and an output end of the comparator being connected to a controller of the buck converter.

12. The server according to claim 11, wherein the comparator is configured to output a preset signal to the controller of the buck converter in response to voltages input at the positive input end of the comparator and the negative input end of the comparator being equal.

13. The server according to claim 11, wherein the controller is configured to generate a signal to control turning off of the lower MOS transistor in the buck converter in response to receiving the preset signal.

14. The server according to claim 11, wherein a resistance value of the first resistor is equal to a resistance value of the second resistor and a resistance value of the third resistor is equal to a resistance value of the fourth resistor.

15. The server according to claim 11, wherein the voltages input at the positive input end of the comparator and the negative input end of the comparator are equal when a phase voltage of the buck converter satisfies the following condition:

$$V_{phase} = \frac{R_5}{R_7} V_{out}$$

$R_5$ being a resistance value of the fifth resistor, $R_7$ being a resistance value of the seventh resistor, $V_{out}$ being the output voltage of the buck converter, and $V_{phase}$ being the phase voltage of the buck converter.

16. The server according to claim 11, wherein the controller is configured to generate a signal to control turning off of the lower MOS transistor in the buck converter in response to receiving the preset signal.

17. The server according to claim 11, wherein a resistance value of the first resistor is equal to a resistance value of the second resistor and a resistance value of the third resistor is equal to a resistance value of the fourth resistor.

18. The server according to claim 11, wherein the magnitude of the current flowing through the first resistor is:

$$I_1 = \frac{1}{2}\beta_1(V_a - V_{thn1} - I_aR_5 - I_1R_3 - V_{phase})^2$$

wherein $V_{thn1}$ is a voltage drop when the third transistor is conducting, $\beta_1$ is a parameter of the third transistor.

19. The server according to claim 18, wherein magnitude of the current flowing through the second resistor is:

$$I_2 = \frac{1}{2}\beta_2(V_a - V_{thn2} - I_2R_4 - V_{gnd})^2$$

wherein $V_{thn2}$ is a voltage drop when the fourth transistor is conducting, $\beta_2$ is a parameter of the fourth transistor.

20. The server according to claim 19, wherein parameters of the third transistor are the same as parameters of the fourth transistor.

\* \* \* \* \*